Aug. 21, 1934.   C. H. ZWERMANN   1,970,789
CLOSET BOWL AND TANK STRUCTURE
Filed May 2, 1932
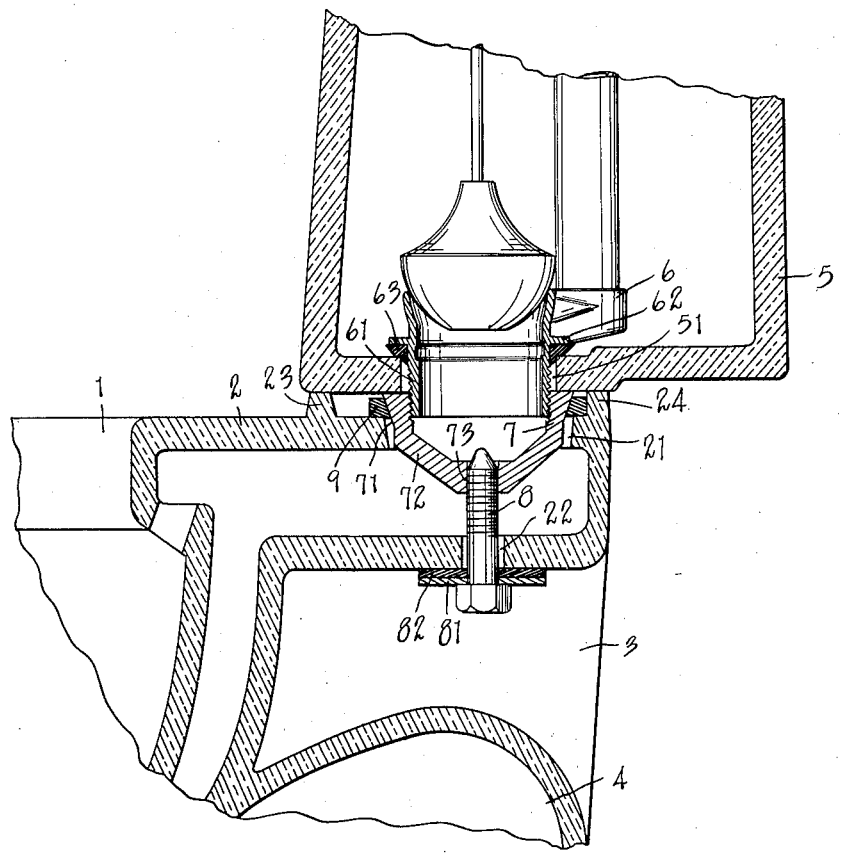
INVENTOR
Carl H. Zwermann
BY
ATTORNEY S Patented Aug. 21, 1934

1,970,789

UNITED STATES PATENT OFFICE 1,970,789

CLOSET BOWL AND TANK STRUCTURE

Carl H. Zwermann, Robinson, Ill.; Helene Zwermann and Carl H. Zwermann, Jr., executrix and executor of said Carl H. Zwermann, deceased Application May 2, 1932, Serial No. 608,720

6 Claims. (Cl. 4—14)

This invention relates to an improved combination closet bowl and tank structure.

The objects of the invention are:

First, to provide such a structure with an effective joint means for coupling the detachable tank to the shelf of the closet bowl.

Second, to provide such a structure that accommodates itself to the variations and warpings due to the firing of the pottery and for any other inaccuracy.

Objects which pertain to details and economies of my invention will definitely appear from the description to follow. The invention is defined in the claims.

A preferred embodiment of my invention is illustrated in the single figure of the accompanying drawing which is a vertical front to rear detail sectional elevation through the joint and the contiguous parts of a water closet bowl and tank therefor.

1 is the water closet bowl, 2 is the hollow rearwardly projecting shelf. 3 is a recess beneath the shelf above the siphon 4. The top wall of the shelf 2 is perforated at 21 with a broad aperture to receive the valve and connection to the tank. The lower wall of the shelf is perforated at 22 to receive the attaching screw. The top of the shelf 2 is provided with cross ribs 23, 24 seen in cross section, which may be ground on their upper surfaces, as required, to make an effective joint with the tank above and provide a concealed recess for the packing of the joint between the tank and bowl.

5 is the flush tank having aperture 51 in the bottom for the valve and connection. 6 is the flush valve with the hollow screw connection 61 flanged at 62. 7 is the lock nut for the valve and is provided with an externally tapered surface 71 near the top. 63 is the gasket for the valve disposed under the flange 62 and is drawn to place by the lock nut 7. The lock nut is provided with a cross bar 72 having an axially disposed screw threaded aperture 73. 8 is the attaching screw disposed upwardly through the aperture 22 in the lower shelf wall into the screw threaded hole 73 in the lock nut to clamp the entire structure in place.

9 is the rubber gasket washer with beveled inner surface corresponding to the tapered outer surface 71 of the lock nut 7. This projects from the lock nut sufficiently to rest upon the top of the shelf 2 so that when the parts are clamped in place the washer is forced down against the top surface of the shelf and the tapered portion of the lock nut 7 wedges into the same, making a tight joint with plenty of clearance between the top of the washer and the under side of the tank. This allows for variation in dimension and secures a tight joint independent of any clamping action upon the gasket.

A washer 81 is provided under the head of the screw 8 with a gasket 82 to close the aperture 22 in the lower wall of the hollow shelf. This structure is an improvement in certain details on the structure appearing in my patent application for a combined closet bowl and tank structure filed November 25, 1931, Serial No. 577,185 which has resulted in Patent No. 1,869,401, Aug. 2, 1932.

I desire here to claim the particular arrangement of the lock nut and the particular form of washer because of their simplicity and their consequent economy in manufacture. By this structure the irregularities are completely and effectively taken care of without the necessity of adjusting parts to effectively clamp a gasket.

Having thus described my invention what I claim as new and desire to secure by Letters Patent is:

1. The combination of a water closet bowl with a laterally projecting hollow shelf having suitable upwardly projecting joint ribs on its upper surface and apertured on the top to receive a flush valve and lock nut and on the under side for a clamping screw, a flush tank, a flush valve fixture within the tank and having a portion projecting therefrom, a lock nut external of said flush tank and engaging said projecting portion for retaining the flush valve in place having an upwardly outwardly flaring tapered surface at the top and a cross bar having a screw threaded axial aperture, a rubber gasket having a tapered inner wall corresponding to the flaring tapered surface on the lock nut, and an under surface adapted to rest on the top of said hollow shelf, and a clamping screw disposed through the lower shelf wall having suitable packing to clamp the parts together whereby said tapered lock nut engages the taper of said gasket to force the under surface thereof against said hollow shelf to form a seal without clamping said gasket and the wedging action of said tapered locking nut in said gasket forms a seal between said nut and said gasket.

2. The combination with a water closet bowl having a laterally projecting hollow shelf, a tank, a flush valve fixture within the tank and having a portion projecting therefrom, a lock nut external of said flush tank and engaging said projecting portion for retaining the flush valve in place having an outwardly upwardly flaring tapered surface, a rubber gasket having a tapered inner wall corresponding to the said lock nut, and an under surface adapted to rest on the top of said hollow shelf, and a clamping means for retaining the said parts together whereby said tapered lock nut engages the taper of said gasket to force the under surface thereof against said hollow shelf to form a seal without clamping said gasket and the wedging action of said tapered locking nut in said gasket forms a seal between said nut and said gasket.

3. The combination with a water closet bowl having a laterally projecting hollow shelf, a tank, a flush valve fixture within the tank and having a portion projecting therefrom, a lock nut external of said flush tank and engaging said projecting portion for retaining the flush valve in place having an outwardly upwardly flaring tapered surface, a rubber gasket having a tapered inner wall corresponding to the said lock nut, and a clamping screw for engaging the said lock nut and clamping the parts together whereby said tapered lock nut engages the taper of said gasket to force the under surface thereof against said hollow shelf to form a seal without clamping said gasket and the wedging action of said tapered locking nut in said gasket forms a seal between said nut and said gasket.

4. The combination with a water closet bowl having a laterally projecting hollow shelf and having a suitable projecting joint surface on its upper side and apertured on the top to receive a flush valve and projecting lock nut, of a tank, a flush valve fixture within the tank having a portion projecting therefrom, a lock nut external of said flush tank and engaging said projecting portion for retaining the same in place having an upwardly and outwardly flaring tapered surface at the top, a rubber gasket having a tapered inner wall corresponding to the flaring tapered surface of said lock nut, and an under surface adapted to rest on the top of said hollow shelf, and means to clamp the parts together whereby said tapered lock nut engages the taper of said gasket to force the under surface thereof against said hollow shelf to form a seal without clamping said gasket and the wedging action of said tapered locking nut in said gasket forms a seal between said nut and said gasket.

5. In a structure of the class described, the combination of joint members, connections therefor comprising a projecting member having an outwardly flaring tapered surface, a yielding gasket having a corresponding tapered inner surface embracing the said flaring surface, and an under surface adapted to rest on the surface of one of said members, clamping means for forcing the said parts together whereby said tapered member engages the taper of said gasket to force the under surface of said gasket against one joint member to form a seal without clamping said gasket and the wedging action of said member in said gasket forms a seal between the taper of said gasket and said member 6. In a structure of the class described, the combination of means for forming a joint between porcelain members comprising means projecting from one porcelain member having an outwardly flaring tapered surface, a yielding gasket having a corresponding tapered inner surface embracing said flaring surface and a portion adapted to rest on the surface of the other porcelain member, and means for forcing said parts together whereby said tapered surface engages the taper of said gasket to force the surface of said gasket against said other porcelain member to form a seal without clamping said gasket and the wedging action of said tapered surface in said gasket forms a seal between said tapered surface and said gasket.

CARL H. ZWERMANN.